US010277100B2

(12) United States Patent
Asano et al.

(10) Patent No.: US 10,277,100 B2
(45) Date of Patent: Apr. 30, 2019

(54) ROTATING ELECTRIC MACHINE

(71) Applicants: DAIKIN INDUSTRIES, LTD., Osaka-Shi, Osaka (JP); NAGOYA INSTITUTE OF TECHNOLOGY, Nagoya-shi, Aichi (JP)

(72) Inventors: Yoshinari Asano, Osaka (JP); Takashi Kosaka, Aichi (JP)

(73) Assignees: Daikin Industries, Ltd., Osaka-shi, Osaka (JP); Nagoya Institute of Technology, Nagoya-shi, Aichi (JP)

( * ) Notice: Subject to any disclaimer, the term of this patent is extended or adjusted under 35 U.S.C. 154(b) by 0 days.

(21) Appl. No.: 15/761,481

(22) PCT Filed: Aug. 29, 2016

(86) PCT No.: PCT/JP2016/003919
§ 371 (c)(1),
(2) Date: Mar. 20, 2018

(87) PCT Pub. No.: WO2017/051505
PCT Pub. Date: Mar. 30, 2017

(65) Prior Publication Data
US 2019/0058381 A1    Feb. 21, 2019

(30) Foreign Application Priority Data
Sep. 25, 2015  (JP) .................. 2015-187947

(51) Int. Cl.
*H02K 1/00* (2006.01)
*H02K 19/12* (2006.01)
(Continued)

(52) U.S. Cl.
CPC ............... *H02K 19/12* (2013.01); *H02K 3/48* (2013.01); *H02K 21/04* (2013.01); *H02K 21/38* (2013.01)

(58) Field of Classification Search
CPC .......... H02K 19/12; H02K 3/48; H02K 21/04; H02K 21/38; H02K 21/44
(Continued)

(56) References Cited

U.S. PATENT DOCUMENTS

| 5,717,316 A | * | 2/1998 | Kawai | ..................... H02K 1/276 310/156.49 |
| 5,864,198 A | * | 1/1999 | Pinkerton | ................ H02K 3/20 310/112 |

(Continued)

FOREIGN PATENT DOCUMENTS

| CN | 101277053 A | 10/2008 |
| CN | 103066786 A | 4/2013 |

(Continued)

OTHER PUBLICATIONS

International Seach Report (PCT/ISA/210) issued in PCT/JP2016/003919, dated Nov. 22, 2016.

(Continued)

*Primary Examiner* — Thanh Lam
(74) *Attorney, Agent, or Firm* — Birch, Stewart, Kolasch & Birch, LLP (57) ABSTRACT

A stator core and a rotor core are provided. The stator core includes field windings receiving a direct current, and armature windings receiving an alternating current. Permanent magnets, each housed in one of the slots together with ones of the field windings, and in contact with the ones of the field windings, are provided. The field windings are provided on both of inner and outer circumferential sides of the permanent magnets.

7 Claims, 10 Drawing Sheets

(51) Int. Cl.
 *H02K 21/38* (2006.01)
 *H02K 21/04* (2006.01)
 *H02K 3/48* (2006.01)

(58) Field of Classification Search
 USPC .................................... 310/179–181, 40 R
 See application file for complete search history.

(56) References Cited

U.S. PATENT DOCUMENTS

| | | | |
|---|---|---|---|
| 6,051,904 A | | 4/2000 | Akemakou |
| 6,262,508 B1 * | | 7/2001 | Shibayama ............ H02K 21/00 |
| | | | 310/152 |
| 9,917,484 B2 * | | 3/2018 | Aoyama .................. H02K 3/28 |
| 2012/0169267 A1 | | 7/2012 | Nashiki et al. |
| 2013/0049494 A1 * | | 2/2013 | Jung ...................... H02K 21/44 |
| | | | 310/46 |
| 2017/0346374 A1 * | | 11/2017 | Bouvier ................. H02K 21/44 |

FOREIGN PATENT DOCUMENTS

| | | |
|---|---|---|
| JP | 11-308829 A | 11/1999 |
| JP | 2012-114975 A | 6/2012 |
| JP | 2013-201869 A | 10/2013 |
| WO | WO 2007/101876 A1 | 9/2007 |

OTHER PUBLICATIONS

Extended European Search Report issued in the counterpart European Patent Application No. 16848296.6, dated Feb. 12, 2019.

* cited by examiner

ROTATING ELECTRIC MACHINE

TECHNICAL FIELD

The present invention relates to a rotary electric machine.

BACKGROUND ART

Some of electric motors, which are one type of rotary electric machines, include a stator with both of windings and permanent magnets such that the magnetic flux of the permanent magnets flows from the stator to a rotor (see, e.g., Patent Document 1). In the example of Patent Document 1, predetermined ones of windings (field windings) are in contact with some of permanent magnets. The conduction of a direct current to the field windings is controlled to control the magnetic flux of the permanent magnets. In addition, AC power is supplied to the other windings (armature windings) to rotate the rotor.

CITATION LIST

Patent Document

[Patent Document 1] Japanese Unexamined Patent Publication No. 2013-201869

SUMMARY OF THE INVENTION

Technical Problem

However, in the example of the patent document, the permanent magnets are provided closer to the inner circumference of the electric motor than the field windings are. The magnetic flux of the field windings and the magnetic flux of the permanent magnets flow in opposite directions. The permanent magnets need to have high coercivity to prevent or reduce demagnetization of the permanent magnets caused by the magnetic flux flowing in the opposite direction. This tends to increase the costs of the permanent magnets. To address the problem, the permanent magnets may be provided closer to the outer circumference of the electric motor than the field windings are. However, as will be described later in detail, the areas for the windings and the magnetic pole areas of the permanent magnets are difficult to obtain at the same time. Specifically, in the case where the permanent magnets are provided closer to the outer circumference of the electric motor than the field windings are, a desired torque is difficult to obtain.

The present invention was made in view of the problems. It is an objective of the present invention to improve the efficiency of the rotary electric machine, while preventing or reducing an increase in the coercivity of the permanent magnets.

Solution to the Problem

In order to achieve the objective, a first aspect of the present invention is directed to a rotary electric machine including
a stator core (21) including
teeth (211) arranged at predetermined intervals along a circumference of a ring-like stator yoke (212), and
slots (213), each formed between two of the teeth (211);
a rotor core (11) facing the stator core (21) with a predetermined air gap interposed therebetween;
field windings (23), each housed in one of the slots (213) and receiving a direct current;
armature windings (24), each wound around predetermined one(s) of the teeth (211), housed in ones of the slots (213), and receiving an alternating current;
permanent magnets (22), each housed in one of the slots (213) together with ones of the field windings (23), and in contact with the ones of the field windings (23); and
a power source (30) configured to supply electric power to the field windings (23).

The field windings (23) are provided on both of inner and outer circumferential sides of the permanent magnets (22).

Ones of the field windings (23), which face each other on the inner and outer circumferential sides with one of the permanent magnets (22) interposed therebetween, are wound in a same direction as viewed from ends of the field windings (23), through which a current from the power source (30) flows in.

This configuration supplies magnetic flux from the field windings (23) on the inner and outer circumferential sides of the permanent magnets (22).

A second aspect is an embodiment of the first aspect. In the second aspect,
a radial thickness (t1) of each of portions of the stator core (21) corresponding to the slots (213a) housing the field windings (23) is smaller than a radial thickness (t2) of each of portions of the stator core (21) corresponding to the slots (213b) housing the armature windings (24).

This configuration easily causes magnetic saturation in the portions of the stator core (21), which correspond to the slots (213a) housing the field windings (23), when a current flows to the field windings (23). Magnetic saturation hardly occurs in the portions corresponding to the slots (213b) housing the armature windings (24) as compared to the portions corresponding to the slots (213a) housing the field windings (23).

A third aspect is an embodiment of the first or second aspect. In the third aspect,
in the slots (213a) housing the field windings (23), a circumferential width (wo) of each of portions of the slots (213a), which house field windings (23o) on outer circumferential sides of the permanent magnets (22), is greater than a circumferential width (wi) of each of portions of the slots (213a), which house field windings (23i) on inner circumferential sides of the permanent magnets (22), and a circumferential width (wm) of each of the permanent magnets (22).

In this configuration, magnetic saturation hardly occurs in the teeth (211) (especially, the portions on the side surfaces of the magnets).

A fourth aspect is an embodiment of any one of the first to third aspects. In the fourth aspect,
a minimum distance (do) between each of the portions of the slots (213a), which house the field windings (23o) on the outer circumferential sides of the permanent magnets (22), and adjacent one of the slots (213b) housing the armature windings (24) is shorter than or equal to a minimum distance (di) between each of the portions of the slots (213a), which house the field windings (23i) on the inner circumferential sides of the permanent magnets (22), and adjacent one of the slots (213b) housing the armature windings (24).

This configuration easily expands the region, which houses the field windings (23) on the outer circumferential sides of the permanent magnets (22), along the circumference of the stator yoke (212).

A fifth aspect is an embodiment of any one of the first to fourth aspects. In the fifth aspect, the permanent magnets (22) are neodymium-iron-boron based magnets containing no heavy rear-earth element or a heavy rear-earth element only around their surfaces.

A sixth aspect is an embodiment of any one of the first to fifth aspects. In the sixth aspect, all the field windings (23o) on the outer circumferential sides of the permanent magnets (22) are made of a common wire material, and all the field windings (23i) on the inner circumferential sides of the permanent magnets (22) are made of a common wire material.

This configuration enables common power supply to all the field windings (23o) on the outer circumferential sides, and, similarly, to all the field windings (23i) on the inner circumferential sides. This leads to reduction in the number of wires for power supply.

A seventh aspect is directed to a method of operating a rotary electric machine.

The rotary electric machine includes
a stator core (21) including
teeth (211) arranged at predetermined intervals along a circumference of a ring-like stator yoke (212), and
slots (213), each formed between two of the teeth (211);
a rotor core (11) facing the stator core (21) with a predetermined air gap interposed therebetween;
field windings (23), each housed in one of the slots (213) and receiving a direct current;
armature windings (24), each wound around predetermined one(s) of the teeth (211), housed in ones of the slots (213), and receiving an alternating current;
permanent magnets (22), each housed in one of the slots (213) together with ones of the field windings (23), and in contact with the ones of the field windings (23);
and a power source (30) configured to supply electric power to the field windings (23). The field windings (23) are provided on both of inner and outer circumferential sides of each of the permanent magnets (22). Ones of the field windings (23), which face each other on the inner and outer circumferential sides with one of the permanent magnets (22) interposed therebetween, are wound in a same direction as viewed from ends of the field windings (23), through which a current from the power source (30) flows in.

The method includes:
selecting one of operation modes; and
operating the rotary electric machine in the selected one of the operation modes.

The operation modes include at least two of:
a first operation mode in which no current flows to the field windings (23),
a second operation mode in which a current flows to the field windings (23) so that magnetic flux of the field windings (23) flows in field slot yoke portions (212a) in a direction opposite to magnetic flux of the magnets interposed between the field windings (23), and
a third operation mode in which a current flows to the field windings (23) so that the magnetic flux of the field windings (23) flows in the field slot yoke portions (212a) in a same direction as the magnetic flux of the magnets interposed between the field windings (23).

Advantages of the Invention

The first aspect improves the efficiency of the rotary electric machine, while preventing or reducing an increase in the coercivity of the permanent magnets.

Each of the second to fourth aspects allows the magnetic flux of the windings and the magnets to flow to the rotor core (11) more efficiently.

The fifth aspect enables formation of the permanent magnets from a relatively low-cost material.

The sixth aspect facilitates wirings for power supply.

The seventh aspect enables operation suitable for, for example, the application of the rotary electric machine.

DESCRIPTION OF EMBODIMENTS

Embodiments of the present invention will now be described in detail with reference to the drawings. The following embodiment is a mere example in nature, and is not intended to limit the scope, applications, or use of the invention.

Embodiment of Invention

Figure 1:
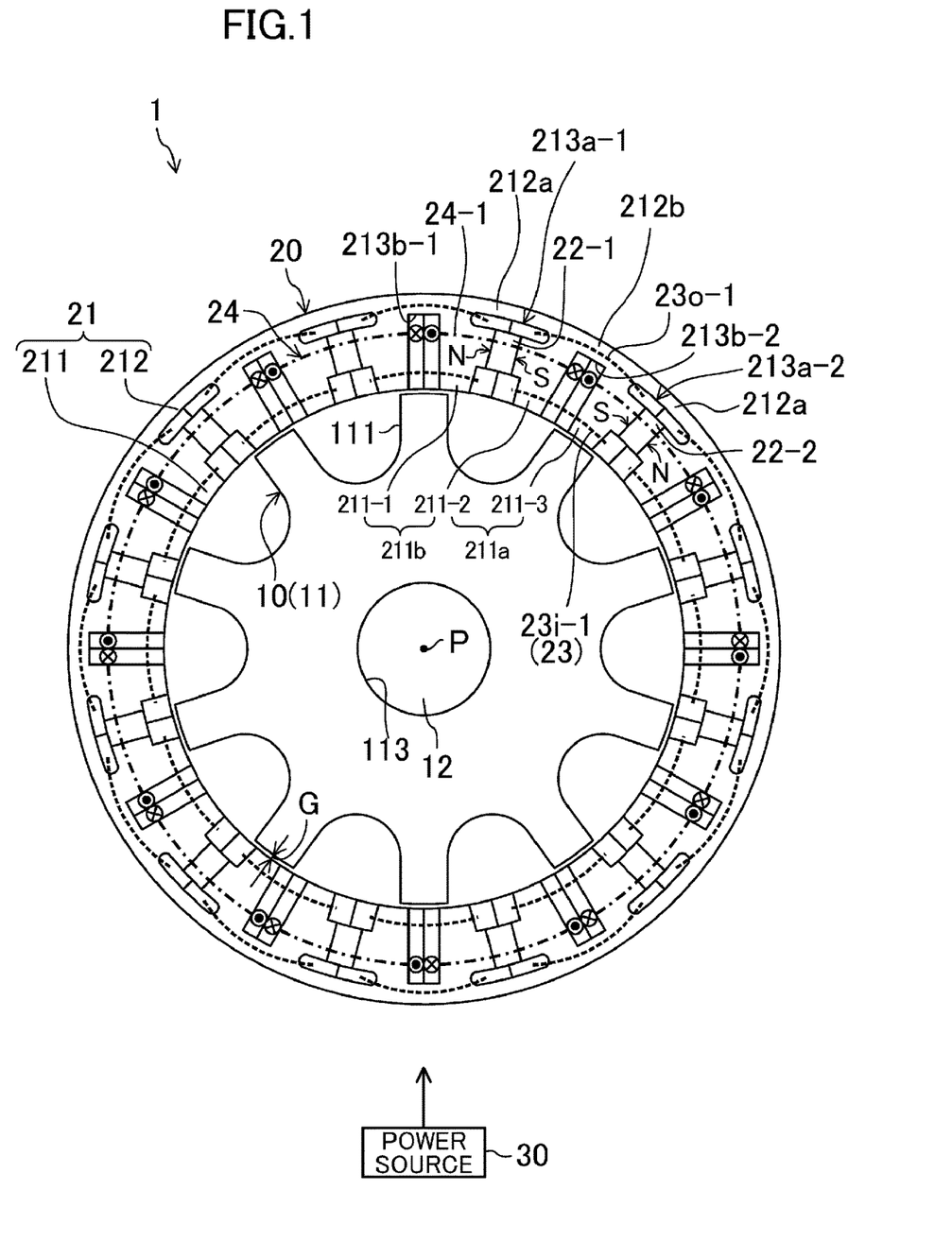
FIG. 1 is a cross-sectional view illustrating a structure of an electric motor according to an embodiment of the present invention.

Now, an exemplary electric motor will be described as an example of the rotary electric machine according to the present invention. FIG. 1 is a cross-sectional view illustrating a structure of an electric motor (1) according to an embodiment of the present invention. As shown in FIG. 1, the electric motor (1) includes a rotor (10) and a stator (20), which correspond to each other and face each other with a predetermined air gap (G) interposed therebetween, and is housed in a casing (not shown). This electric motor (1) may be used for, for example, a vehicle or a compressor for an air conditioner. A drive shaft (12) provided in the rotor (10) drives, for example, a transmission of a vehicle or a compressor of an air conditioner.

Out of the terms used in the following description, an "axial" direction is the direction in which an axis (P) of the drive shaft (12) extends, and a "radial" direction is the direction orthogonal to the axis (P). "Outer circumferential side" of a component is a side far from the axis (P), and an "inner circumferential side" is a side closer to the axis (P).

Rotor

The rotor (10) includes a rotor core (11) and the drive shaft (12). The rotor core (11) is made of a soft magnetic material. The rotor core (11) of this embodiment is a multilayer core formed by stacking, in the axial direction, numbers of core members obtained by pressing an electromagnetic steel sheet. As shown in FIG. 1, a through-hole (113), into which the drive shaft (12) is inserted, is formed in the center of the rotor core (11). The rotor core (11) is provided with projections (111) projecting toward the outer circumferential side. The projections (111) are arranged at regular pitches along the circumference of the rotor core (11). That is, the rotor core (11) has a gear-like shape as viewed in the axial direction.

Stator

The stator (20) includes a stator core (21), permanent magnets (22), field windings (23), and armature windings (24).

Stator Core (21)

Figure 2:
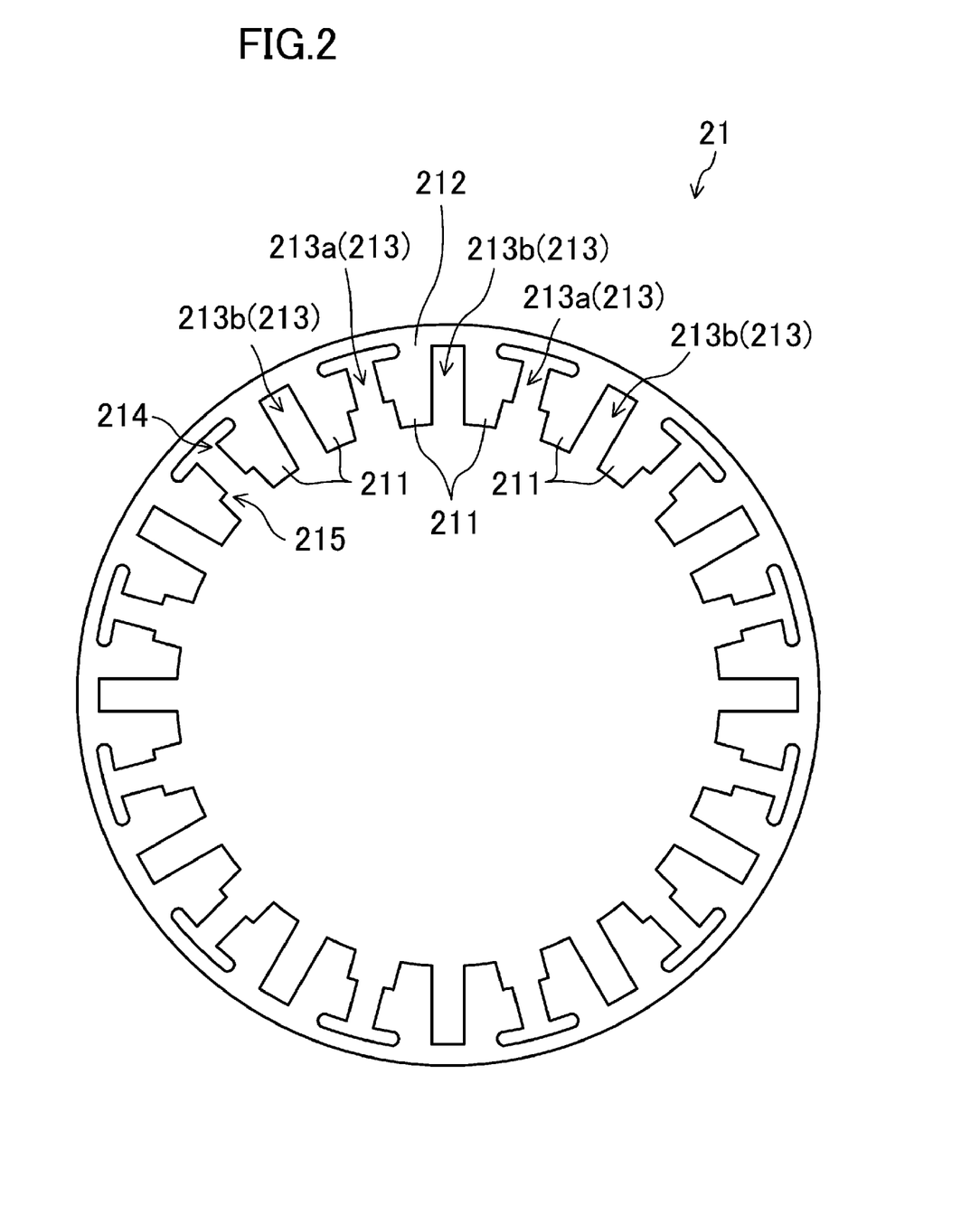
FIG. 2 illustrates a stator core as viewed in an axial direction.

The stator core (21) is made of a soft magnetic material. In this example, the stator core (21) is a multilayer core formed by stacking, in the axial direction, numbers of core members obtained by pressing an electromagnetic steel sheet. FIG. 2 illustrates a stator core (21) as viewed in an axial direction. As shown in FIG. 2, the stator core (21) includes a stator yoke (212) and teeth (211). The stator yoke (212) is formed in a ring-like shape on the outer circumferential side of the stator core (21). The teeth (211) project from the inner circumferential surface of the stator yoke (212) toward the inner circumferential side. In the example of FIG. 2, 24 teeth (211) are provided, which are arranged at predetermined pitches along the circumference of the stator yoke (212) around the axis (P). As a result, a space is formed between each adjacent pair of teeth (211).

These spaces between the teeth (211) function as slots (213) housing the permanent magnets (22), the field windings (23), and the armature windings (24). The slots (213) include two types of: field slots (213a) and armature slots (213b). Specifically, the field slots (213a) are pairs of the slots (213), each of which are adjacent to each other along the circumference of the stator yoke (212) with one of the slots interposed therebetween. The armature slots (213b) are the ones of the slots (213) other than the field slots (213a). That is, the field slots (213a) and the armature slots (213b) are arranged alternately along the circumference of the stator yoke (212). If specific ones of the elements, such as the field slots (213a) and the armature slots (213b) existing in plurality are focused on, branch numbers will be added to their reference characters (e.g., 213a-1, 213a-2, . . . ) in the following description.

Armature Windings (24)

The armature windings (24) are for forming a rotating magnetic field. In the stator (20), each of the armature windings (24) is wound around ones of the teeth (211) and housed in ones of the armature slots (213b). More specifically, each armature winding (24) is wound around a pair of teeth (211) (hereinafter also referred to as a pair of armature teeth (211b)) interposed between a pair of armature slots (213b), which are adjacent to each other along the circumference of the stator yoke (212). Specifically, each armature winding (24) is wound around one of the pairs of armature teeth (211b), with the radial axis regarded as the winding axis. That is, each of the armature windings (24) is, as a concentrated winding, wound around a pair of armature teeth (211b) regarded as a single teeth. As viewed specifically in FIG. 1, for example, an armature winding (24-1) is wound around a pair of armature teeth (211b) composed of teeth (211-1) and (211-2) interposed between the armature slots (213b-1) and (213b-2), which are adjacent to each other along the circumference of the stator yoke (212).

An alternating current is supplied to the armature windings (24) to form a rotating magnetic field. If, for example, three-phase armature windings are employed as the armature windings (24), a three-phase alternating current flows to the armature windings (24). The alternating current flowing to the armature windings (24) maybe controlled, for example, by an inverter circuit.

Field Windings (23)

The field windings (23) are for controlling the magnetic flux of the permanent magnets (22). Each of these field windings (23) is wound around ones of the teeth (211) and housed in the field slots (213a). In this example, two of the field windings (23) are wound around a pair of teeth (211) (hereinafter also referred to as a pair of field teeth (211a)) interposed between a pair of field slots (213a), which are adjacent to each other along the circumference of the stator yoke (212). Specifically, each of two field windings (23) is wound around one of the pairs of field teeth (211a), with the radial axis regarded as the winding axis. That is, two of the field windings (23) are, as concentrated windings, wound around a pair of field teeth (211a) regarded as a single teeth. A direct current is flowed to these field windings (23) to cause excitation necessary. Thus, the field windings (23) are connected to a power source (30) (see FIG. 7). Various types may be employed as the power source (30) to supply DC power to the field windings (23). For example, a chopper circuit (e.g., a step-down circuit, a step-up circuit, or a step-up/down circuit) may be used to easily control the direct current flowing to the field windings (23). That is, the direct current flowing to the field windings (23) may contain a pulsating component.

Permanent Magnets (22)

The stator (20) is provided with the permanent magnets (22). In this example, the permanent magnets (22) are rear-earth magnets made of a rear-earth element. More specifically, the permanent magnets (22) are magnets (neodymium-iron-boron based magnets) containing neodymium, iron, and boron as main components, and sintered magnets containing, only around their surfaces, a heavy rear-earth element (e.g., dysprosium (Dy) or terbium (Tb)) by grain boundary diffusion.

Each of the permanent magnets (22) has a quadrangular cross-section (the plane shown in FIG. 1) orthogonal to the axis (P) (a rectangular cross-section with generally longer sides in the radial direction in this example). The permanent magnets (22) have almost the same axial length as the stator core (21). That is, the permanent magnets (22) of this embodiment are rectangular parallelepipeds. Each of these permanent magnets (22) is placed in one of the field slots (213a) such that each magnetic pole face of the permanent magnet (22) faces the magnetic pole face, of the adjacent one of the permanent magnets (22) with the same polarity, along the circumference of the stator yoke (212) (see, FIG. 1). That is, the permanent magnets (22) are magnetized along the circumference of the stator yoke (212). These permanent magnets (22) are arranged such that their magnetic pole faces facing in one direction along the circumference of the stator yoke (212) have alternately different polarity. In addition, this embodiment is characterized by the positional relation between the permanent magnets (22) and the field windings (23).

Positional Relation Between Permanent Magnets (22) and Windings

First, the relation between the permanent magnets (22) and the armature windings (24) is viewed. The permanent magnets (22) are surrounded by the armature windings (24) in the radial direction (see FIG. 1).

On the other hand, the relation between the permanent magnets (22) and the field windings (23) is viewed. As shown in FIG. 1, each permanent magnet (22) is housed in one of the field slots (213a) together with ones of the field windings (23), and in contact with the ones of the field windings (23). More specifically, each pair of field teeth (211a) is provided with two of the field windings (23), which are in contact with one of the permanent magnets (22) on both the inner and outer circumferential sides of the permanent magnet (22). The ones of the field windings (23), which face each other on the inner and outer circumferential sides, with the permanent magnet (22) interposed therebetween, are wound in a same direction as viewed from ends of the field windings (23), through which a current from the power source (30) flows in.

In the following description, if the field windings (23) on the inner and outer circumferential sides of the permanent magnets (22) need to be distinguished from each other, the field windings (23) on the inner circumferential sides are represented by field windings (23i), with the suffix "i" added to the reference numeral of the field windings (23), while the field windings (23) on the outer circumferential sides are represented by field windings (23o), with the suffix "o" added to the reference numeral of the field windings (23). If specific ones of the field windings (23i) on the inner circumferential sides and the field windings (23o) are focused on, branch numbers are further added to the suffixes (e.g., 23i-1 and 23o-1).

The layout of the permanent magnets (22) and the field windings (23) according to this embodiment is viewed specifically in FIG. 1. For example, the field winding (23o-1) is wound around the pair of field teeth (211a) composed of the teeth (211-2) and (211-3) interposed between the field slots (213a-1) and (213a-2) along the circumference of the stator yoke (212). This field winding (23o-1) is located closer to the outer circumferential side than the permanent magnet (22-1) or (22-2) is. Similarly, the field winding (23i-1) is wound around the teeth (211-2) and (211-3). This field winding (23i-1) is located closer to the inner circumferential side than the permanent magnet (22-1) or (22-2) is.

In this example, all the field windings (23o) on the outer circumferential sides of the permanent magnets (22) are made of a common wire material (a single covered wire). Similarly, all the field windings (23i) on the inner circumferential sides of the permanent magnets (22) are made of a common wire material. In order to form the field windings (23) from a common wire material in this manner, the wire material may be wound around one of the pairs of field teeth (211a), and then continuously wound around the pair of field teeth (211a) adjacent to the one of the pairs in the direction opposite to the direction, in which the wire material is wound around the one of the pairs.

Dimensions of Slots and Stator Yoke

Figure 3:
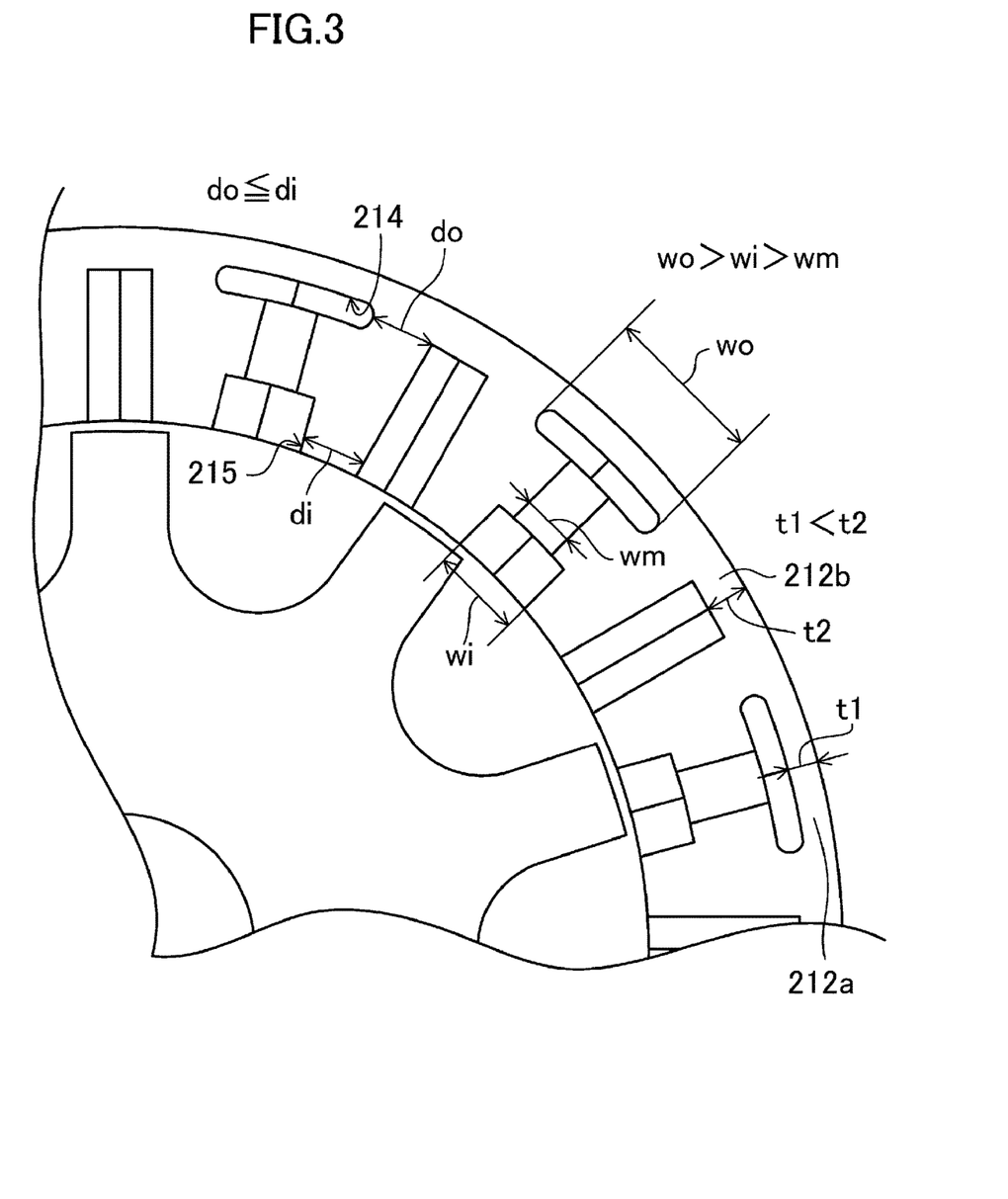
FIG. 3 illustrates the dimensional relation between slots and other elements in this embodiment.

In this embodiment, the dimensions of the slots (213) and the stator yoke (212) are considered to improve the efficiency of the electric motor (1), which will be described later. FIG. 3 illustrates dimensional relation between the slots (213) and other elements in this embodiment. In this embodiment, the minimum distance (do) between each of the portions (hereinafter referred to as outer field slot portions (214)) of the field slots (213a), which house the field windings (23o) on the outer circumferential sides, and the adjacent one of the armature slots (213b) is smaller than or equal to the minimum distance (di) between each of the portions (hereinafter referred to as inner field slot portions (215)) of the field slots (213a), which house the field windings (23i) on the inner circumferential sides, and the armature slot (213b) (i.e., do≤di).

In this embodiment, as shown in FIG. 3, the radial thickness (t1) of each of portions (hereinafter referred to as field slot yoke portions (212a)) of the stator yoke (212) corresponding to the field slots (213a) is smaller than the radial thickness (t2) of each of portions (hereinafter referred to as armature slot yoke portions (212b)) of the stator yoke (212) corresponding to the armature slots (213b) (i.e., t1<t2).

Furthermore, in this embodiment, the circumferential width (hereinafter referred to as an outer field slot width (wo)) of each of the outer field slot portions (214) is greater than the circumferential width of (hereinafter referred to as an inner field slot width (wi)) of each of the inner field slot portions (215). In addition, the outer field slot width (wo) is greater than the circumferential width (wm) of each of the permanent magnets (22). That is, there is a relation expressed by wo>wi>wm.

Method of Operating Electric Motor (1) (Method of Exciting Windings)

The electric motor (1) according to this embodiment performs various types of operation modes. Now, three operation modes (first to third operation modes) are described as examples.

First Operation Mode

Figure 4:
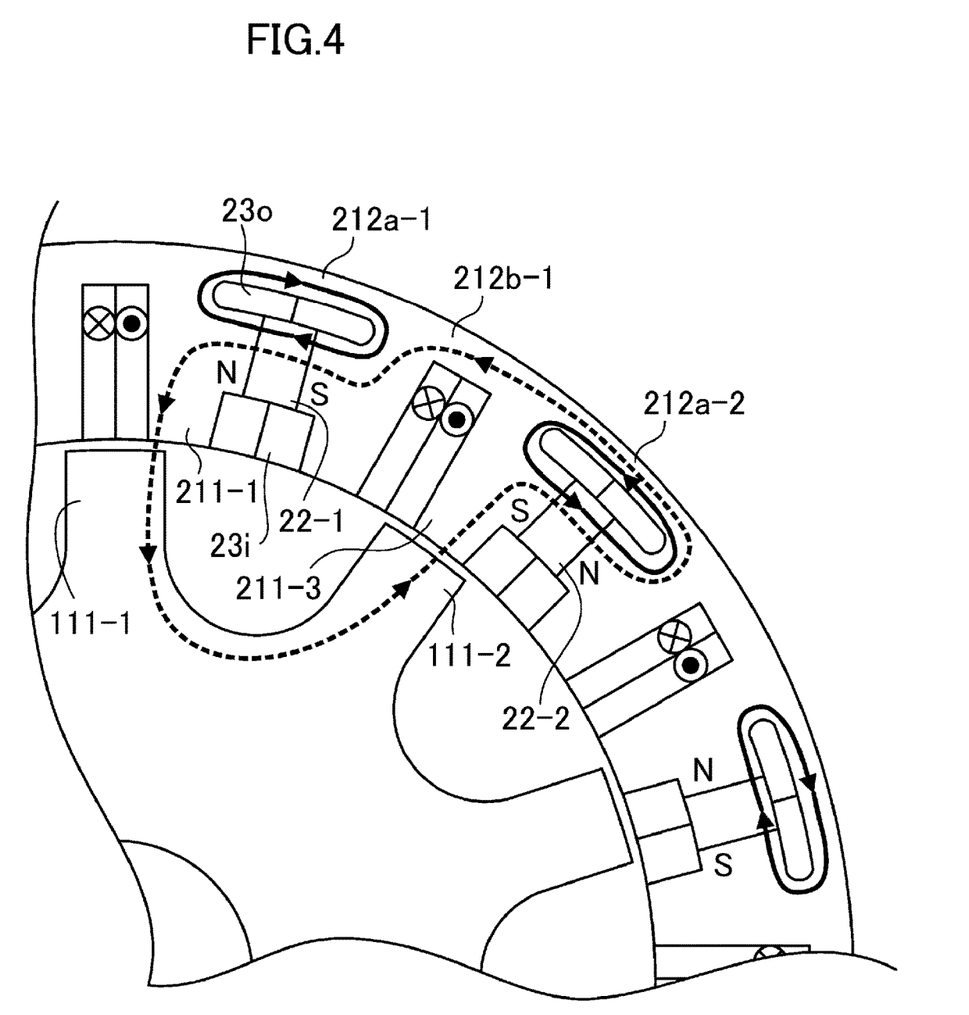
FIG. 4 illustrates the magnetic flux of permanent magnets in the case where no current flows to field windings.

In the first operation mode, no current flows to the field windings (23) (i.e., a zero field current mode). FIG. 4 illustrates the magnetic flux of the permanent magnets (22) in the case where no current flows to the field windings (23). FIG. 4 illustrates a part of the electric motor (1) in the cross-section perpendicular to the axis (P) (about one fourth of the electric motor (1) around the drive shaft (12)). As shown in FIG. 4, the magnetic flux of the permanent magnets (22) (hereinafter also referred to as magnetic flux of the magnets) mainly flows through the path (main path) indicated by a solid arrow, and slight magnetic flux flows through the path (auxiliary path) indicated by a broken arrow. When no current flows to the field windings (23), the magnetic flux of the magnets may be regarded as being short-circuited within the stator (20).

If, in this state, an alternating current flows to the armature windings (24) to form a rotating magnetic field, the magnetic flux of the armature windings (24) and the magnetic flux of the permanent magnets (22) cross each other to generate torque at the rotor (10). The torque (T) generated at the electric motor (1) by the magnetic flux of the magnets in this operation mode is expressed by the following equation.

$$T = P_n (\Phi_{mag}) i_q$$

In this equation, $P_n$ represents the number of pole pairs, $\Phi_{mag}$ represents the magnitude of the magnetic flux of the magnets, and $i_q$ represents the magnitude of the current (q-axis current) of the armature windings (24).

Since no current flows to the field windings (23) in this operation mode, copper loss is zero in the field windings (23). This operation mode is useful to operate the electric motor (1) at a relatively high speed and low torque.

Second Operation Mode

Figure 5:
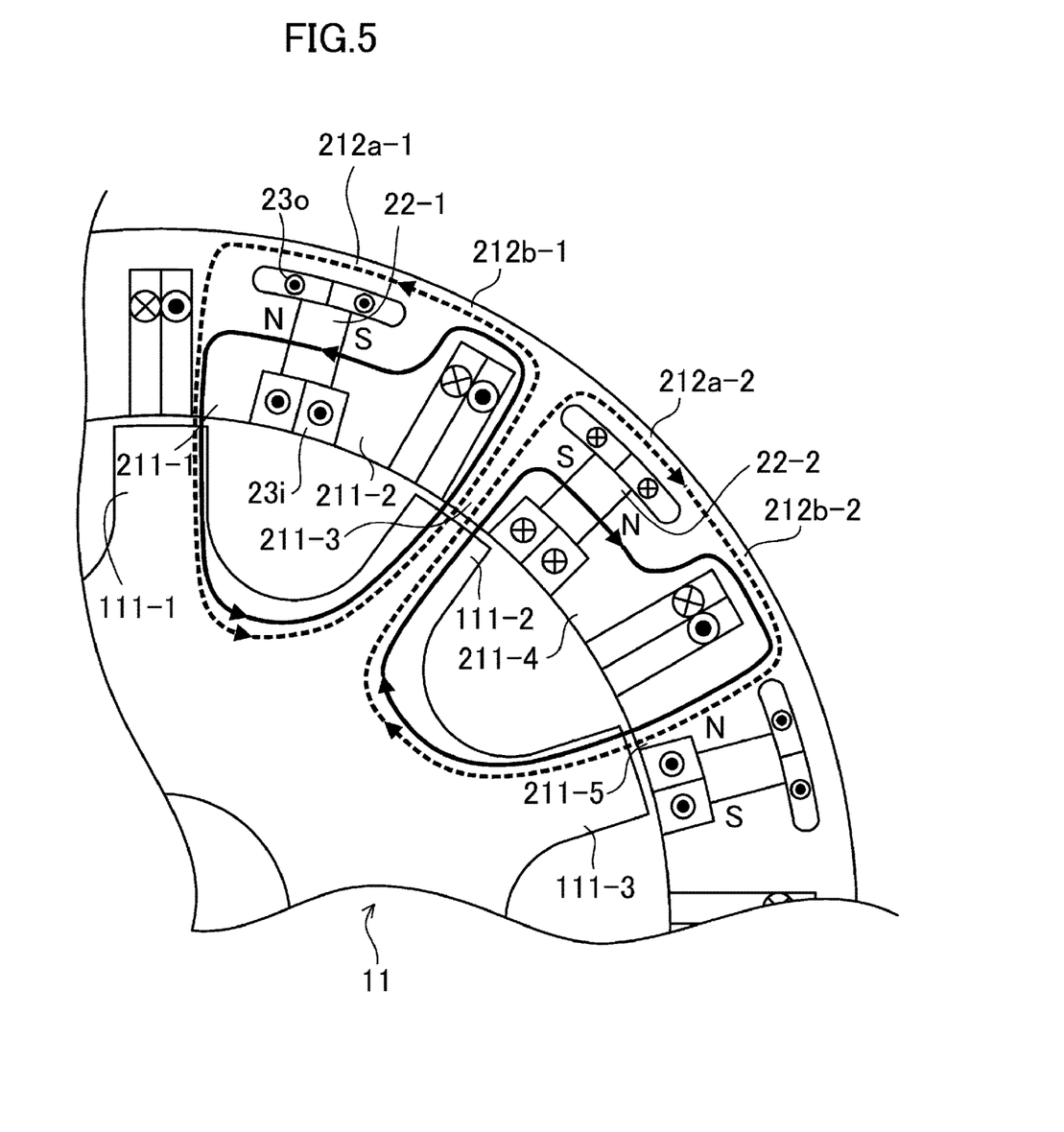
FIG. 5 illustrates the magnetic flux of the magnets in the case where a current flows to the field windings.

In the second operation mode, the magnetic flux of the field windings (23) is used to allow the magnetic flux of the magnets to flow to the rotor core (11) (i.e., a stronger field control mode). FIG. 5 illustrates the magnetic flux of the magnets in the case where a direct current flows to the field windings (23). FIG. 5 also illustrates a part of the electric motor (1) in the cross-section perpendicular to the axis (P) (about one fourth of the electric motor (1) around the drive shaft (12)). The magnetic flux of the permanent magnets (22) and the magnetic flux of the field windings (23) (hereinafter also referred to as magnetic flux of the windings) are indicated by the solid and broken arrows, respectively.

In the example of FIG. 5, a direct current controlled to a predetermined value flows to the field windings (23) so that the magnetic flux of the magnets passes through the rotor core (11). Specifically, a current flows to the field windings (23) so that the magnetic flux of the windings flows in the field slot yoke portion (212*a*) in the direction opposite to the magnetic flux of the magnets shown in FIG. 4. The direct current here may contain a higher harmonic component according to switching. In FIG. 5, the directions of the currents flowing to the field windings (23) are indicated by known symbols (a black dot inside a circle, and a cross inside a circle).

If DC power is supplied to the field windings (23) in this manner, the magnetic flux of the field windings (23) causes magnetic saturation in the field slot yoke portions (212*a*). Then, the magnetic flux of the magnets hardly passes through the field slot yoke portions (212*a*). As a result, the magnetic flux of the magnets flows to the rotor core (11) via predetermined ones of the teeth (211).

For example, the magnetic flux of the permanent magnet (22-1) flows to the tooth (211-1) at the magnetic saturation of the associated field slot yoke (212*a*-1), and then to the projection (111-1) of the rotor core (11) (see FIG. 5). The magnetic flux of the magnet, which has flowed to the projection (111-1), flows via the adjacent (right in FIG. 5) projection (111-2) to the tooth (211-3). The magnetic flux of the magnet returns via the armature slot yoke portion (212*b*-1) and the tooth (211-2) to the permanent magnet (22-1).

The magnetic flux of the permanent magnet (22-2) flows to the armature slot yoke portion (212*b*-2) due to the magnetic saturation of the associated field slot yoke (212*a*-2), and then via the tooth (211-5) to the projection (111-3) of the rotor core (11). The magnetic flux of the magnet, which has flowed to the projection (111-3), flows via the adjacent (left in FIG. 5) projection (111-2) to the tooth (211-3). The magnetic flux of the magnet returns via the tooth (211-3) to the permanent magnet (22-2).

The magnetic flux of the magnets and the magnetic flux of the windings shown in FIG. 5 are mere examples. The paths of the magnetic flux of the magnets and the magnetic flux of the windings may vary depending on the rotational position of the rotor core (11) (the positions of the projections (111)). However, even if the rotational position of the rotor core (11) changes, the magnetic flux of the magnets and the magnetic flux of the windings flow through the rotor core (11).

As described above, in the electric motor (1), the magnetic flux of the magnets and the magnetic flux of the windings pass through the rotor core (11) to function as field magnetic flux.

If, in this operation mode as well, an alternating current flows to the armature windings (24) to form a rotating magnetic field, the magnetic flux of the armature windings (24) and the magnetic flux of the permanent magnets (22) cross each other to generate torque at the rotor (10). The torque (T) of the electric motor (1) in this operation mode is represented by the following equation.

$$T=P_n(\Phi_{mag}+\Phi_f)i_q$$

In this equation as well, $P_n$ represents the number of pole pairs, $\Phi_{mag}$ represents the magnitude of the magnetic flux of the magnets, and $i_q$ represents the magnitude of the current (q-axis current) of the armature windings (24). In addition, $\Phi_f$ represents the magnetic flux of the field windings (23) (hereinafter referred to as magnetic flux of the field windings).

As can be seen from the above equation, the magnitude of the field magnetic flux is controlled by controlling the direct current flowing to the field windings (23). For example, stronger field control is performed at a low-speed rotation to increase the magnitude of the field magnetic flux and output great torque. On the other hand, at a high-speed rotation, the magnitude of the field magnetic flux is reduced to adjust an induced voltage and increase the rotation speed. The reduction in the magnitude of the magnetic flux of the field windings leads to reduction in the copper loss at the field windings (23).

Third Operation Mode

Figure 6:
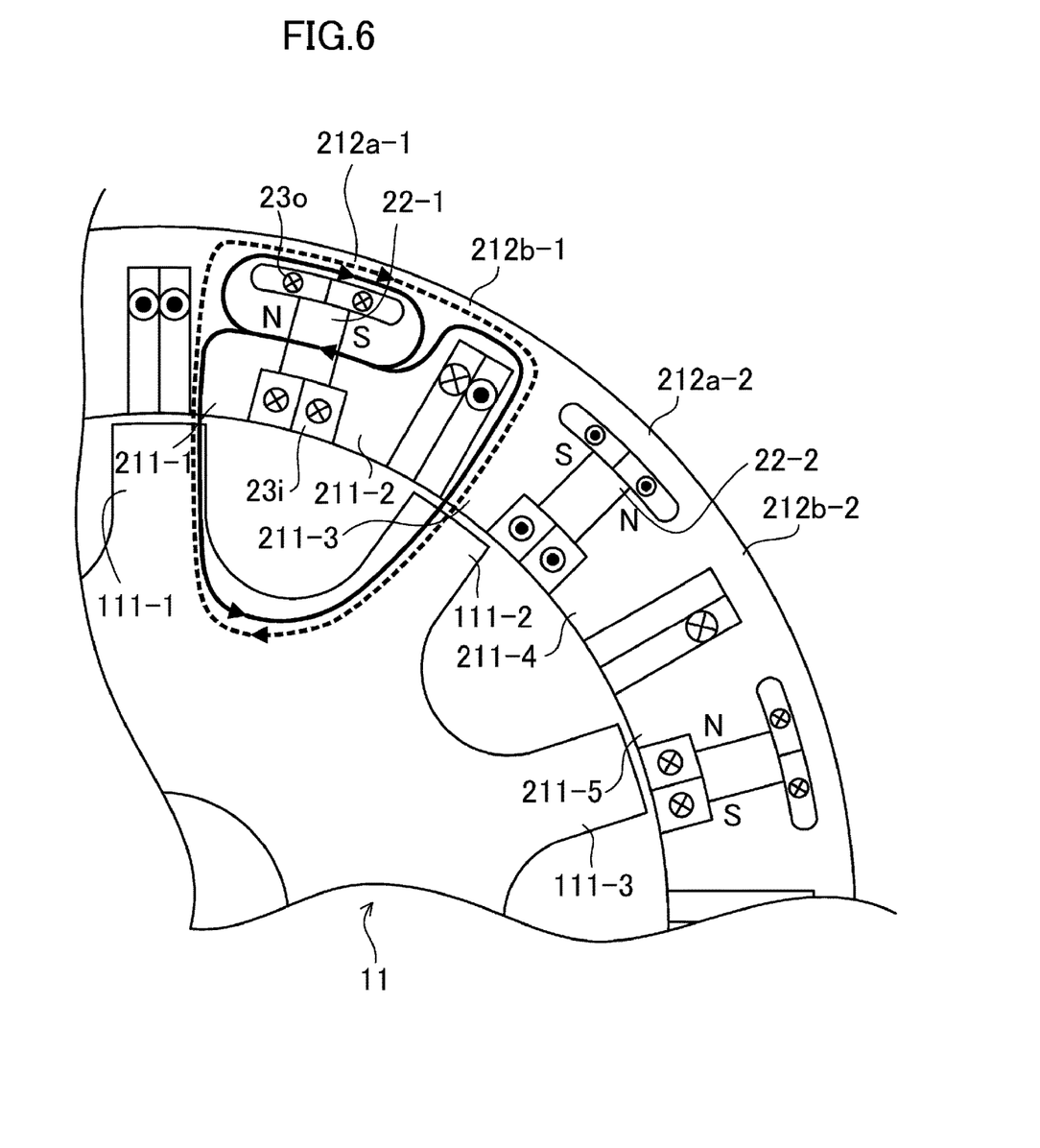
FIG. 6 illustrates the magnetic flux of the magnets and the magnetic flux of the field windings in a third operation mode.

In the third operation mode, the magnetic flux of the field windings flows in the direction opposite to the magnetic flux of the magnets flowing toward the rotor core (11). FIG. 6 illustrates the magnetic flux of the magnets and the magnetic flux of the field windings in the third operation mode.

In this operation mode, a current flows to the field windings (23) in the direction opposite to that in the second operation mode. If DC power is supplied to the field windings (23) in this manner, the magnetic flux of the field windings (23) causes magnetic saturation in the field slot yoke portion (212*a*). The magnetic flux of the permanent magnets (22) flows toward one of the teeth (211). However, in this operation mode, the magnetic flux of the field windings and the magnetic flux of the magnets flow in opposite directions. As a result, the magnitude of the magnetic flux flowing to the rotor core (11) decreases. That is, in this operation mode, the magnetic flux of the magnet flowing to the rotor core (11) is reduced or nullified by adjusting the current of the field windings (23).

If, in this operation mode as well, an alternating current flows to the armature windings (24) to form a rotating magnetic field, torque is generated at the rotor (10). The torque (T) of the electric motor (1) in this operation mode is expressed by the following equation.

$$T=P_n(\Phi_{mag}-\Phi_f)i_q$$

This operation mode enables reduction in the induced voltage, and is useful to operate the electric motor (1) at a relatively high speed and low torque. In addition, the rotor (10) is easily detached at maintenance by cancelling the magnetic flux of the magnets as described above.

As described above, the electric motor (1) of this embodiment performs various types of operation modes. Thus, a controller for controlling the operation of this electric motor (1) may select one of the operation modes in accordance with, for example, the rotational speed or the magnitude of the load. However, the controller does not necessarily handle all the operation modes described above. For example, the controller may switch any two of the operation modes.

Advantages of Embodiment

As will be described below, the electric motor (1) of this embodiment requires permanent magnets with lower coercivity than an electric motor (hereinafter referred to as an electric motor with inner magnets), in which permanent magnets are provided on the inner circumferential sides of the field windings in a stator. Furthermore, the electric motor (1) of this embodiment has higher efficiency than this electric motor with inner magnets, and an electric motor (hereinafter referred to as an electric motor with outer magnets), in which permanent magnets are provided on the outer circumferential sides of the field windings in a stator.

Figure 7:
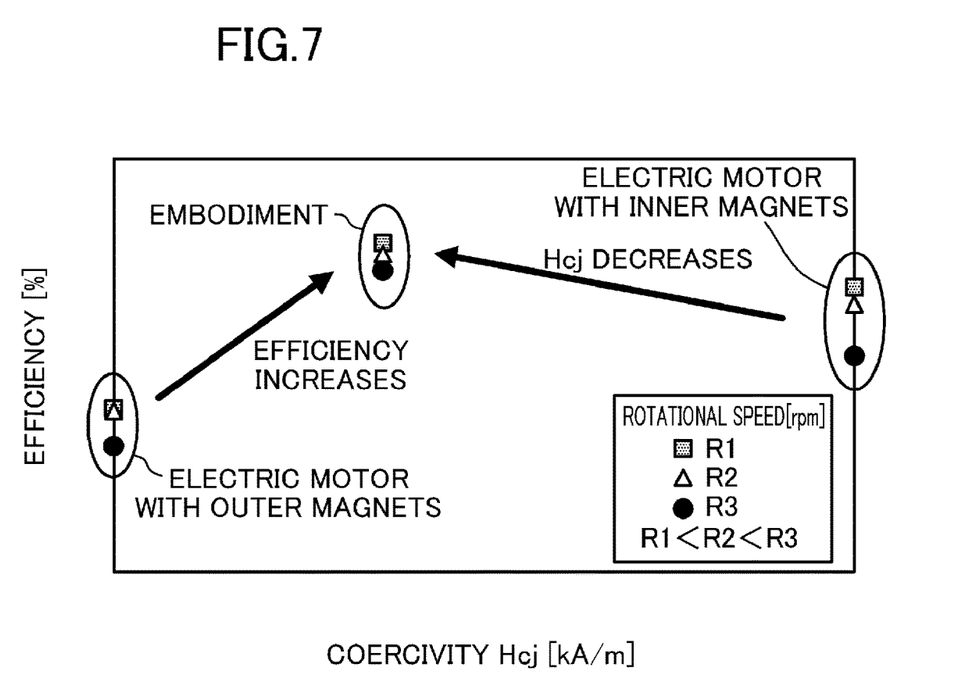
FIG. 7 illustrates an exemplary relation between the coercivity and the efficiency of the electric motor according to this embodiment, an electric motor with inner magnets and an electric motor with outer magnets.

FIG. 7 illustrates an exemplary relation between the coercivity (Hcj)[kA/m] and the efficiency [%] of the electric motor (1) of this embodiment, the electric motor with inner magnets and the electric motor with outer magnets. This figure illustrates the comparison among three types of: electric motors of the electric motor (1) of this embodiment, the electric motor with inner magnets, and the electric motor with outer magnets, under the same output torque at three rotational speeds. The efficiency of the electric motors is obtained by the ratio of the output (specifically, torque× rotational speed) and the input (supplied electric power). The efficiency of the electric motor (1) of this embodiment is expressed by output/(Pca+Pcf+Pi+output), where the copper loss of the armature windings is Pca, the copper loss of the field windings is Pcf, and the iron loss of the motor is Pi.

Figure 8:
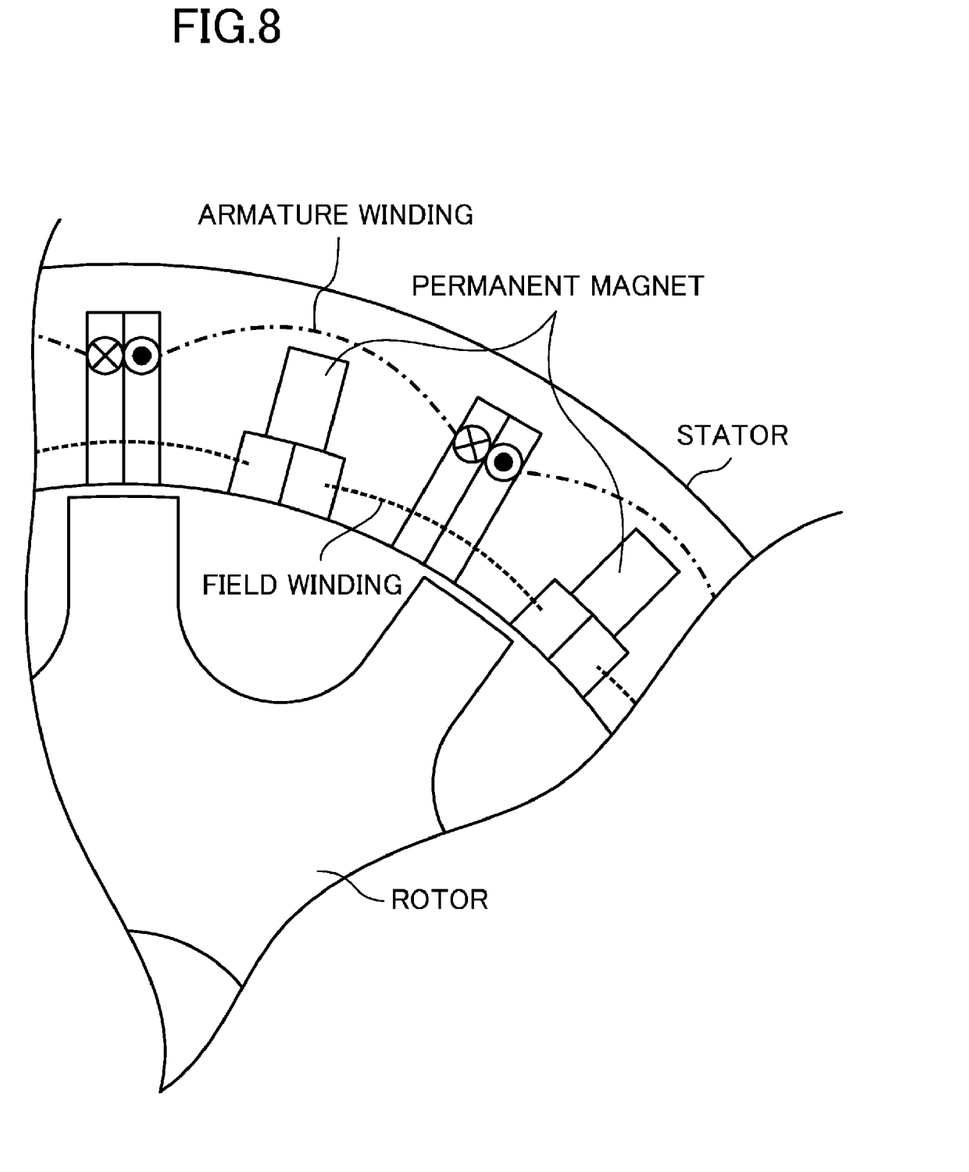
FIG. 8 illustrates an exemplary layout of windings and permanent magnets in the electric motor with outer magnets.

FIG. 8 illustrates an exemplary layout of windings and permanent magnets in the electric motor with outer magnets. For example, the radial length of the permanent magnets may be increased to generate higher torque in the electric motor with outer magnets. If the outer diameter of the stator is limited, an increase in the radial length of the permanent magnets reduces the inner diameter of the stator or the space for the windings. With respect to the electric motor with outer magnets, the radial length of the permanent magnets and the area of the magnetic poles are difficult to increase the practical size of an electric motor. By contrast, in this embodiment, the outer field slot portion (214) has a wide circumferential area, thereby obtaining the space for winding outer field windings (23o). For this, the radial length of the permanent magnets (22) increases. That is, this embodiment easily provides a desirably rated electric motor (with the maximum output).

Figure 9:
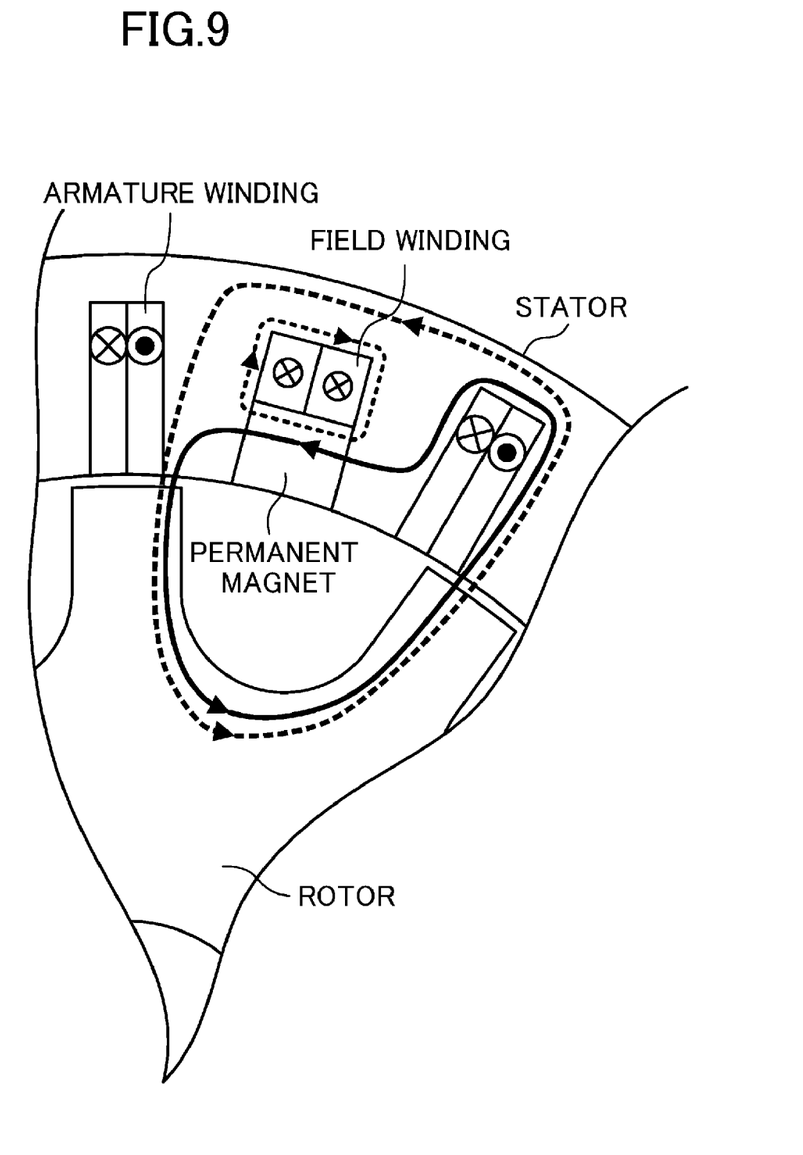
FIG. 9 illustrates exemplary magnetic flux of windings and exemplary magnetic flux of magnets in the electric motor with inner magnets.

On the other hand, in the case of the electric motor with inner magnets, the magnetic flux of the field windings and the magnetic flux of the permanent magnets flow in opposite directions in the portions of the teeth on the side surfaces of the magnets. FIG. 9 illustrates exemplary magnetic flux of a winding and exemplary magnetic flux of a magnet of the electric motor with inner magnets. In FIG. 9, the dotted arrow represents a shorting magnetic path of the magnetic flux of the magnet, and the solid arrow represents an interlinking magnetic path the magnetic flux of the magnet. In this figure, the broken arrow represents the magnetic path of the magnetic flux of the field winding. As shown in FIG. 9, in the electric motor with inner magnets, in a portion of a tooth, in which the magnetic flux of the winding and the magnetic flux of the magnet flow in opposite directions, magnetic saturation hardly occurs, and the voltage drop caused by armature reaction is hardly reduced. This power factor hardly improves. In other words, the maximum output (the maximum torque) hardly increases. In order to intentionally cause magnetic saturation of the teeth in the electric motor with inner magnets, the current of the field windings needs to be increased to cancel the magnetic flux of the permanent magnets and needs to be excited until it flows in the same direction. This requires, however, an increase in the ampere-turns, thereby also increasing the cross-sections of the slots for the windings. That is, an increase in the overall size of the electric motor is required.

By contrast, in this embodiment, the magnetic flux of the field windings and the magnetic flux of the permanent magnets (22) flow in the same direction in the portions of the teeth (211) on the side surfaces of the permanent magnets (22) like the electric motor with outer magnets of FIG. 8 (see FIG. 5). Since magnetic saturation tend to occur in the teeth between the inner field slot portion (215) and the armature slots (213b), this embodiment increases the power factor and the maximum output without increasing the ampere-turns. In this embodiment, the direction of the magnetic field of the field windings located on the inner circumferential sides is the same as the direction of magnetization of the permanent magnets. Thus, demagnetization of the permanent magnets (22) hardly occurs as compared to the electric motor with inner magnets. Therefore, this embodiment employs the magnets with high residual magnetic flux density (Br) to endure demagnetization with low coercivity. The magnetic flux density at the operating point increases unlike the electric motor with inner magnets magnetized in the demagnetization field. In addition, this embodiment enables reduction in the amount of the heavy rear-earth in the permanent magnets.

In the stator core (21) of this embodiment, the radial thickness (t1) of each of the field slot yoke portions (212a) is smaller than the thickness (t2) of each of the armature slot yoke portions (212b). Thus, when a current flows to the field windings (23), magnetic saturation easily occurs in the field slot yoke portions (212a). The magnetic saturation in the field slot yoke portions (212a) contributes to stronger field effect (also referred to as torque increasing effect), which prevents or reduces the short-circuiting of the magnetic flux of the permanent magnets (22), and allows the magnetic flux of the magnets to flow to the rotor (10).

On the other hand, when the magnetic flux of the magnets is prevented from being short-circuited in the field slot yoke portions (212a), the magnetic flux of the magnets passes through the armature slot yoke portions (212b). Thus, magnetic saturation in the armature slot yoke portions (212b) is not desirable. In this embodiment, the relation between the radial thickness (t1) of each field slot yoke portion (212a) and the thickness (t2) of each armature slot yoke portion (212b) is represented by the expression of t1<t2. Magnetic saturation hardly occurs in the armature slot yoke portions (212b) as compared to the field slot yoke portions (212a). Therefore, in this embodiment, the magnetic flux of the magnets flows to the rotor core (11) more efficiently.

In this embodiment, the circumferential width (wo) of the outer field slot portions (214) is greater than the circumferential width (wi) of the inner field slot portions (215), and the circumferential width (wm) of the permanent magnets (22). In this embodiment, the minimum distance (do) between each outer field slot portion (214) and the associated one of the armature slots (213b) is shorter than or equal to the minimum distance (di) between each inner field slot portion (215) and the associated one of the armature slots (213b). For example, the portion of each tooth (211) adjacent to one of the field windings (23i) on the inner circumferential sides is magnetically saturated earlier than the short-circuit path of the magnetic flux of the magnets (see FIG. 4), the magnetic flux of the magnets hardly flows toward the rotor. The stronger field effect (torque increasing effect) of the magnetmotive force of the field windings (23i) may be lost. However, this embodiment prevents or reduces the loss of the torque increasing effect by setting the distances and widths to satisfy the expressions di≥do, and wo>wi, respectively, as described above.

In order to efficiently cause the magnetic flux of the magnets, each permanent magnet (22) has an as large as possible surface area. For this purpose, each permanent magnet may have a small thickness in the direction of magnetization (along the magnetic axis) (obviously, however, the thickness needs to be great enough to have the minimum demagnetization resistance).

If the permanent magnets (22) have a small thickness in this manner, the inner field slot portions (215) and the permanent magnets (22) are longer in the radial direction. If the inner field slot portions (215) and the permanent magnets (22) are long in the radial direction, increasing the cross-sections of the field windings by increasing the circumferential width of the outer field slot portions (214) is desired in view of obtaining the stronger field effect (torque increasing effect) to obtain the areas of the slots for the outer field windings (23o) within the limited radial size of the stator (20). That is, this embodiment sets the distances and widths to satisfy the expressions di≥do, and wo>wi, respectively, as described above to obtain pole surface areas required for the permanent magnets (22), while preventing or reducing loss of the torque increasing effect caused by the obtainment.

In this embodiment, all the field windings (23o) on the outer circumferential sides of the permanent magnets (22) are made of a common wire material. This configuration requires a smaller number of lead wires for supplying power to the field windings (23o). Similarly, all the field windings (23i) on the inner circumferential sides of the permanent magnets (22) are made of a common wire material. This configuration requires a smaller number of lead wires for supplying power to the field windings (23i). That is, this embodiment facilitates wirings to the field windings (23).

Other Embodiments

In the electric motor (1), the field windings (23) can be used to magnetize the permanent magnets (22). Specifically, a current flows to the field windings (23o) on the outer circumferential sides of the permanent magnets (22), and the magnetic flux of the windings may be used to magnetize the permanent magnets (22). At this time, no rotor exists in one preferred embodiment.

The material of the permanent magnets (22) is a mere example. The permanent magnets (22) may be made of a magnet material containing no heavy rear-earth element.

The number of the teeth (211) of the stator (20) and the number of the projections (111) of the rotor (10) are also mere examples, and are not limited to what is described in the embodiment.

In addition, the configuration according to the embodiment is applicable not only to electric motors but also generators.

Figure 10:
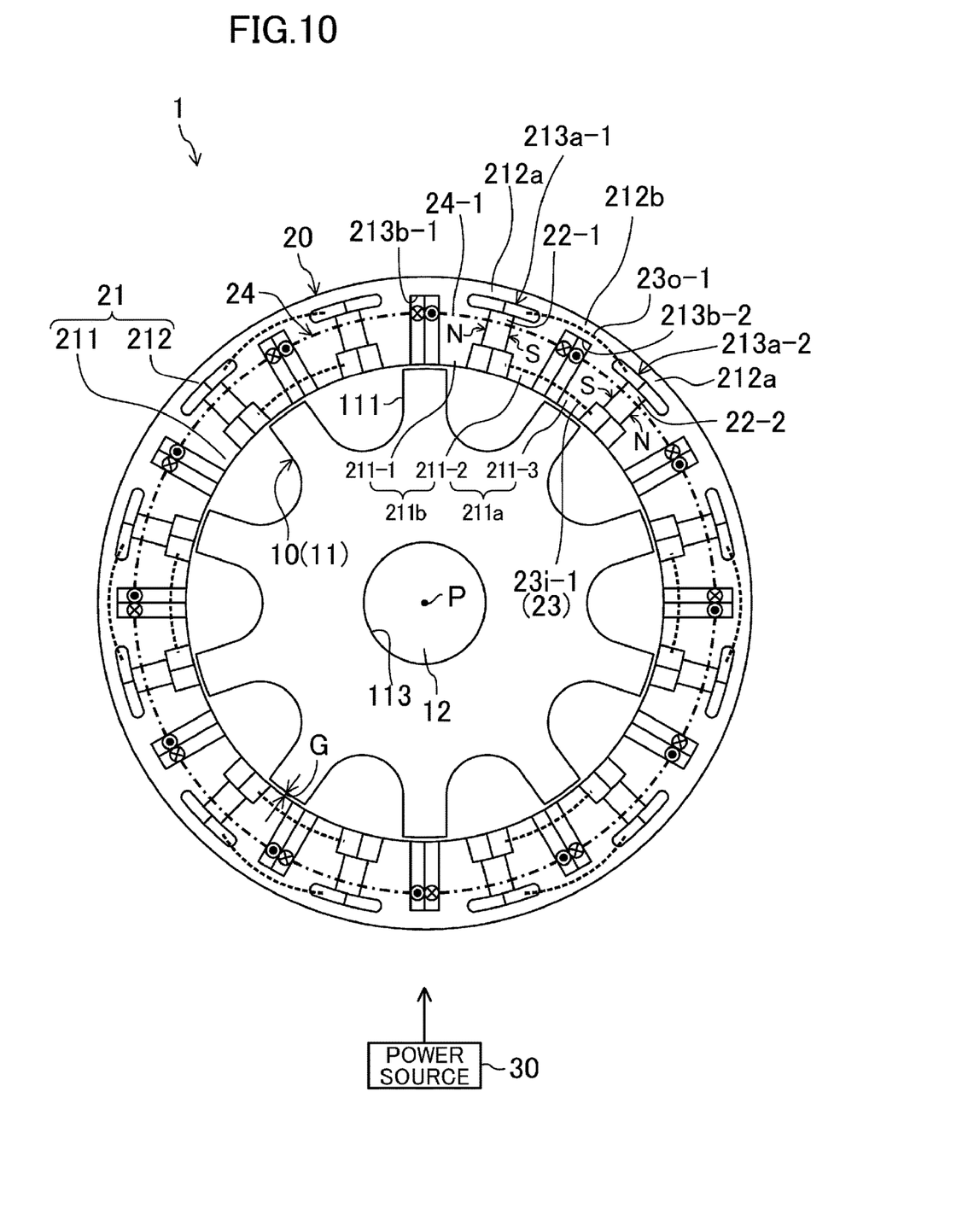
FIG. 10 illustrates an exemplary winding pattern.

How to wind the field windings (23) and the armature windings (24) are mere examples, and are not limited to what is described in the embodiment. For example, every other field winding (23) may be wound (see FIG. 10). The field windings (23) may be wound, for example, around the stator yoke (212) in place of the teeth (211).

INDUSTRIAL APPLICABILITY

The present invention is useful for a rotary electric machine.

DESCRIPTION OF REFERENCE CHARACTERS

1 Electric Motor (Rotary Electric Machine)
11 Rotor Core
21 Stator Core
22 Permanent Magnet
23 Field Winding
24 Armature Winding
211 Tooth
212 Stator Yoke
213 Slot

The invention claimed is:

1. A rotary electric machine comprising:
a stator core including
teeth arranged at predetermined intervals along a circumference of a ring-like stator yoke, and
slots, each formed between two of the teeth;
a rotor core facing the stator core with a predetermined air gap interposed therebetween;
field windings, each housed in one of the slots and receiving a direct current;
armature windings, each wound around predetermined one(s) of the teeth, housed in ones of the slots, and receiving an alternating current;
permanent magnets, each housed in one of the slots together with ones of the field windings, and in contact with the ones of the field windings; and
a power source configured to supply electric power to the field windings, wherein
the field windings are provided on both of inner and outer circumferential sides of the permanent magnets, and
ones of the field windings, which face each other on the inner and outer circumferential sides with one of the permanent magnets interposed therebetween, are wound in the same direction as viewed from an end of the power source, from which the current flows in.

2. The machine of claim 1, wherein
a radial thickness of each of portions of the stator core corresponding to the slots housing the field windings is smaller than a radial thickness of each of portions of the stator core corresponding to the slots housing the armature windings.

3. The machine of claim 1, wherein
in the slots housing the field windings, a circumferential width of each of portions of the slots, which house field windings on outer circumferential sides of the permanent magnets, is greater than a circumferential width of each of portions of the slots, which house field windings on inner circumferential sides of the permanent magnets, and a circumferential width of each of the permanent magnets.

4. The machine of claim 1, wherein
a minimum distance between each of the portions of the slots, which house the field windings on the outer circumferential sides of the permanent magnets, and adjacent one of the slots housing the armature windings is shorter than or equal to a minimum distance between each of the portions of the slots, which house the field windings on the inner circumferential sides of the permanent magnets, and adjacent one of the slots housing the armature windings.

5. The machine of claim 1, wherein
the permanent magnets are neodymium-iron-boron based magnets containing no heavy rear-earth element or a heavy rear-earth element only around their surfaces.

6. The machine of claim 1, wherein
all the field windings on the outer circumferential sides of the permanent magnets are made of a common wire material, and
all the field windings on the inner circumferential sides of the permanent magnets are made of a common wire material.

7. A method of operating a rotary electric machine, where the rotary electric machine includes a stator core including
  teeth arranged at predetermined intervals along a circumference of a ring-like stator yoke, and
  slots, each formed between two of the teeth;
a rotor core facing the stator core with a predetermined air gap interposed therebetween;
field windings, each housed in one of the slots and receiving a direct current;
armature windings, each wound around predetermined one(s) of the teeth, housed in ones of the slots, and receiving an alternating current;
permanent magnets, each housed in one of the slots together with ones of the field windings, and in contact with the ones of the field windings; and a power source configured to supply electric power to the field windings,
the field windings are provided on both of inner and outer circumferential sides of each of the permanent magnets, ones of the field windings, which face each other on the inner and outer circumferential sides with one of the permanent magnets interposed therebetween, are wound in a same direction as viewed from ends of the field windings, through which a current from the power source flows in,
the method comprising:
selecting one of operation modes; and
operating the rotary electric machine in the selected one of the operation modes, wherein
the operation modes include at least two of:
a first operation mode in which no current flows to the field windings,
a second operation mode in which a current flows to the field windings so that magnetic flux of the field windings flows in field slot yoke portions in a direction opposite to magnetic flux of the magnets interposed between the field windings, and
a third operation mode in which a current flows to the field windings so that the magnetic flux of the field windings flows in the field slot yoke portions in a same direction as the magnetic flux of the magnets interposed between the field windings.

* * * * *